US011241717B2

(12) United States Patent
Hu et al.

(10) Patent No.: US 11,241,717 B2
(45) Date of Patent: Feb. 8, 2022

(54) PARCEL SORTING SYSTEM CAPABLE OF MULTI-PATH SYNCHRONOUS SORTING

(71) Applicant: UNIVERSITY OF SOUTH CHINA, Hunan (CN)

(72) Inventors: Liangbin Hu, Hunan (CN); Yuan Yu, Hunan (CN); Huanxi Wang, Hunan (CN); Xiangyu Gu, Hunan (CN); Lin Zhong, Hunan (CN); Liang Li, Hunan (CN); Qianshen Zhu, Hunan (CN)

(73) Assignee: UNIVERSITY OF SOUTH CHINA, Hengyang (CN)

( * ) Notice: Subject to any disclaimer, the term of this patent is extended or adjusted under 35 U.S.C. 154(b) by 217 days.

(21) Appl. No.: 16/721,966

(22) Filed: Dec. 20, 2019

(65) Prior Publication Data
US 2020/0331031 A1 Oct. 22, 2020

(30) Foreign Application Priority Data

Apr. 16, 2019 (CN) .......................... 201910301610.8

(51) Int. Cl.
*B07C 3/04* (2006.01)
*B65G 1/08* (2006.01)
(Continued)

(52) U.S. Cl.
CPC .................. *B07C 3/04* (2013.01); *B07C 5/36* (2013.01); *B07C 5/38* (2013.01); *B65G 1/08* (2013.01);
(Continued)

(58) Field of Classification Search
CPC .... B07C 3/04; B07C 5/36; B07C 5/38; B07C 3/02; B65G 11/06; B65G 11/066; B65G 11/063
See application file for complete search history.

(56) References Cited

U.S. PATENT DOCUMENTS 1,245,224 A * 11/1917 Hady ................... B65G 11/063
  193/12
4,262,797 A * 4/1981 Schuricht ............... B65G 1/045
  198/756
(Continued)

FOREIGN PATENT DOCUMENTS

| CN | 106076856 B |   | 5/2017 |
| CN | 108502246 A |   | 9/2018 |
| CN | 108502246 A | * | 9/2018 |

*Primary Examiner* — Patrick H Mackey

(57) ABSTRACT

Disclosed is a parcel sorting system, it includes a main frame and a sorting tower; the main frame includes a vertically arranged spiral slide and a supporting plate horizontally arranged outside the spiral slide, and the lower end of the spiral slide is provided with a collection bag main outlet. The supporting plate is provided with a collection bag falling port facing the spiral slide; the sorting tower includes a receiving transfer device, a plurality of bagging output devices disposed below the receiving transfer device, and a tower housing disposed below the bagging output device; A plurality of sorting towers are arranged on the supporting plate around the spiral slides, and the collection bag discharge ports of each sorting tower are respectively connected to the falling ports of the collection bags of the supporting plates. The invention which greatly improves sorting efficiency compared to single-pass sorting of existing sorting systems.

12 Claims, 10 Drawing Sheets

(51) Int. Cl.
*B65G 11/06* (2006.01)
*B65G 47/51* (2006.01)
*B07C 5/38* (2006.01)
*B07C 5/36* (2006.01)

(52) U.S. Cl.
CPC ........ *B65G 11/063* (2013.01); *B65G 47/5145* (2013.01)

(56) References Cited

U.S. PATENT DOCUMENTS

| | | | | |
|---|---|---|---|---|
| 6,371,275 B1* | 4/2002 | Terrell | ................. | B65G 11/063 |
| | | | | 193/12 |
| 7,641,034 B2* | 1/2010 | Boustani | .............. | B65G 11/063 |
| | | | | 193/12 |
| 10,793,358 B1* | 10/2020 | Lwali | .................. | B65G 11/063 |

* cited by examiner

PARCEL SORTING SYSTEM CAPABLE OF MULTI-PATH SYNCHRONOUS SORTING

CROSS REFERENCE TO RELATED APPLICATIONS

The present application claims the benefit of Chinese Patent Application No. 201910301610.8 filed on Apr. 16, 2019, the contents of which are incorporated herein by reference in their entirety.

TECHNICAL FIELD

The present disclosure relates to the field of parcel sorting technology, and more in particular to a parcel sorting system capable of multi-path synchronous sorting.

BACKGROUND

In today's information age, especially under the current Internet plus economy model, logistics is a very important part. Today's consumers, especially the younger generation, are more inclined to shop online, so the daily circulation of domestic and international express delivery is very huge. In the process of express delivery, it is essential to sort the parcels. This process determines whether the parcels can be transported in the right direction. At present, parcel sorting equipment has been widely used in express delivery companies, which has reduced the workload of parcel sorting personnel to a certain extent.

The invention patent with No. 201810101142.5 discloses a multi-level superimposed combined parcel sorting-packing-conveying device, which is used for sorting, packing and conveying of parcels, and sorting and packaging of parcels by address, whole parcel packing and the whole parcel transported to the conveyor belt can be realized.

The shortcoming thereof is that 1. after the collection bag is full, it needs to be taken out by using the pick-up device. The pick-up device is a lifting platform with a robot, and only picks one collection bag full of parcels at a time. If there are more than one collection bags filled with parcels at the same time, they should be taken out one by one by the lifting platform. In the process to be taken out of waiting for the lifting platform, the entire sorting device needs to temporarily stop sorting, which reduces the sorting efficiency.

2. After the collection bag in the collection box is full, the knots thereof need to be sealed, and then picked out by the pick-up device, and finally a new collection bag is automatically opened. In the process of "sealing the full bag—picking-out—new bag open", the entire sorting device needs to temporarily stop sorting, which reduces the sorting efficiency.

The invention patent with No. 201610417812.5 discloses a three-dimensional turret parcel sorting system which can distinguish the parcels by destination and deliver them to corresponding storage containers according to destinations. The shortcomings of its existence are as follows: 1. The turret sorting device has multi-level (at least two), multiple transfer stations, and realizes "one import and multiple exits", which is a pyramid structure with "small upper and big lower". When the terminal region the parcel sorted is more, it may take 3 or even 4 levels, which will result in a very large area at the terminal end, and each parcel will enter the turret sorting device from the top layer. Only layer-by-layer sorting can enter the lowermost parcel collection box, the parcel sorting path is longer, and the energy consumption of the equipment is larger. 2. only one parcel can be entered into the uppermost layer of the turret sorting device at a time. When the number of parcels is large, the efficiency of the device is slightly lower.

SUMMARY

The object of the present disclosure is to overcome the deficiencies of the prior art, and to provide a parcel sorting system capable of multi-path synchronous sorting, which solves the problem that during the existing parcel sorting device is operating, it needs to be suspended in some cases, resulting in low efficiency of parcel sorting;

It also solves the problem that the sorting path of the existing parcel sorting device is long, resulting in large energy consumption of the device;

It also solves the problem that the existing parcel sorting device only allows the parcel to be entered one by one, and the sorting efficiency is slightly lower.

The technical solution of the invention is that: a parcel sorting system capable of multi-path synchronous sorting, includes a main frame and a sorting tower;

the main frame includes a vertically arranged spiral slide and supporting plates horizontally arranged outside the spiral slide, the number of the supporting plates is not less than one, all the supporting plates are spaced apart from top to bottom; a lower end of the spiral slide is provided with a collection bag main outlet; the supporting plate is provided with a collection bag falling port facing the spiral slide;

The sorting tower includes a receiving transfer device, a plurality of bagging output devices disposed below the receiving transfer device, a tower housing disposed below the bagging output device, and a bowl-shaped inner cavity with a large upper and a small lower space inside the tower housing. The lower end is provided with a collection bag discharge port connected to the bowl-shaped inner cavity, and the upper end is provided with a mounting plate A, and the mounting plate A is provided with a collection bag inlet port connected to the bowl-shaped inner cavity; the lower end of the tower housing is supported and mounted on the supporting plate.

The plurality of sorting towers are arranged on the supporting plate around the spiral slide, and the collection bag discharge ports of each sorting tower are respectively connected to the falling ports of the collection bags of the supporting plates.

A further technical solution of the present disclosure is that the receiving transfer device includes a bracket, a movable plate, a first driving mechanism, a sweeping disk and a second driving mechanism; the upper end of the bracket is provided with a mounting plate B, and the mounting plate B is provided with a plurality of annular uniformly distributed parcel falling ports; the movable plate is movably mounted at each parcel falling port by a hinge, and is associated with the first driving mechanism, which is driven by the driving mechanism to rotate, thereby opening or closing any of the parcel falling ports; a plurality of sweeping arms are disposed at the sweeping disk, and a transfer area is formed between the adjacent sweeping arms. The sweeping disk is disposed at an upper end of the mounting plate B and associated with the second driving mechanism, and is driven by the second driving mechanism to rotate, thereby sweeping the parcels in the transfer area to any of the parcel falling ports;

The receiving transfer device is disposed at the upper end of the tower housing and is fixed to the tower housing by the bracket.

A further technical solution of the present disclosure is that the bagging output device includes a main frame body, a bag shelf, collection bags, a bag release plate, a third driving mechanism, a bag holder and a fourth driving mechanism;

The main frame body includes a lower plate, an upper plate above the lower plate and a connecting column connected between the lower plate and the upper plate; the upper plate is provided with a guide rail for reciprocating the bag holder, and an upper opening for the parcels dropped onto the collection bag. The lower layer is provided with a lower opening facing the upper opening of the upper plate, the upper opening of the upper plate of the main frame body is provided with a correlation-type photoelectric sensor;

The bag shelf is disposed between the lower plate and the upper plate of the main frame body, and includes a bottom plate mounted on the lower plate, a plurality of vertical columns vertically arranged and fixed on the bottom plate, a middle plate movably sleeved on the vertical column and a push-up spring movably sleeved on the column and located between the middle plate and the bottom plate, and the upper end of the column is provided with a spring button, and the spring button protrudes on the surface of the column when unpressed, and is retracted into the interior of the column when pressed;

The collection bag includes a bag body, a drawstring and a cord end tab; a loop of drawstring mounting cavity and a plurality of annular connecting pieces are arranged at the upper edge of the bag body, the drawstring mounting cavity is provided with an inlet and an outlet; the drawstring is worn through the inlet into the drawstring mounting cavity, and then out of the outlet through the drawstring mounting cavity, an end of the drawstring at the inlet is fixed at the upper edge of the bag body, or knotted outside the bag body, an end of the drawstring at the outlet is outside the bag body, and fixed at the cord end tab; the cord end tab comprises a ring suction piece and a ring hook piece fixed at one end of the ring suction piece; the collection bags are stacked on the bag shelf in a vertical direction, and the connecting piece and the ring suction piece are respectively sleeved on the corresponding vertical columns through respective center holes, and all the collection bags locate between the middle plate and the spring button, and the ring suction pieces of all the collection bags are aligned in the vertical direction;

the bag release plate is movably mounted on the lower opening of the lower plate by a hinge, and is associated with the third driving mechanism, it is driven to rotate under the driving of the third driving mechanism, thereby opening or closing the lower opening, and a pressure sensor is provided thereon;

the bag holder is a rectangular frame, and a parcel inlet port for the parcels to fall into the collection bag is arranged at the center, a lower end thereof is fixed with an electromagnet A and a reversing motor, an electromagnet B is coupled to a shaft of the reversing motor, and the electromagnet B is connected with a hook; the electromagnet B is driven to rotate by the reversing motor to switch the hook vertically upward or vertically downward; the bag holder is movably mounted in the guide rail of the upper plate, and is associated with the fourth driving mechanism, the reciprocal movement of the bag holder in the guide rail is driven by the fourth driving mechanism, thereby changing between the position of the collection bag and the position of receiving parcel; when the bag holder moves to the position of the collection bag, the electromagnet A faces the connecting piece of the collection bag mounted on the bag shelf, the electromagnet B faces the ring suction piece of the collection bag mounted on the bag shelf, and the hook faces the ring hook piece of the collection bag mounted on the bag shelf; when the bag holder moves to the position of receiving parcel, it is located at the upper opening of the upper plate and faces the lower opening of the lower plate;

A plurality of bagging output devices are provided between the tower housing and the receiving transfer device, and each of the bagging output devices respectively corresponds to a parcel falling port of the receiving transfer device and a collection bag inlet port of the tower housing, the bagging output device is fixed to the mounting plate A of the tower housing through the lower plate, and the upper opening thereof is opposite to the parcel falling port of the receiving transfer device, and the lower opening thereof is opposite to the inlet port of the collection bag of the tower housing.

According to a still further technical solution of the present disclosure, the upper plate of the main frame body is provided with a receiving baffle surrounding the upper opening, and the receiving baffle and the upper plate are provided with a strip gap between the receiving baffle and the upper plate.

A further technical solution of the present disclosure is that the first driving mechanism includes a hydraulic cylinder A, a cylinder block A, a connecting block A and a connecting block seat A; the hydraulic cylinder A is movably mounted on the cylinder block A through a rotating shaft, and the cylinder block A is fixedly mounted below the mounting plate B; the connecting block A is fixed on an end of a telescopic link of the hydraulic cylinder A, and is movably connected to the connecting block seat A through the rotating shaft, and the connecting block seat A is fixedly mounted below the movable plate;

The second driving mechanism includes a stepping motor A fixedly mounted in the bracket, and a crankshaft thereof extends vertically upward and is fixedly connected with the sweeping disk;

The third driving mechanism includes a hydraulic cylinder B, a cylinder block B, a connecting block B and a connecting block seat B; the hydraulic cylinder B is movably mounted on the cylinder block B through a rotating shaft, and the cylinder block B is fixedly mounted below the lower plate of the main frame body. The connecting block B is fixedly connected to an end of the telescopic link of the hydraulic cylinder B, and is movably connected to the connecting block seat B through the rotating shaft, and the connecting block seat B is fixedly mounted below the bag release plate;

The fourth driving mechanism includes a stepping motor B, a rolling cylinder, a connecting cloth, a sling, a fixed pulley and a weight; the stepping motor B is fixedly mounted on the upper plate of the main frame body, and a crankshaft thereof is coupled to the rolling cylinder to drive the rolling cylinder to rotate; one end of the connection cloth is wound around the rolling cylinder, and the other end is connected to the left outer edge of the bag holder; one end of the sling is attached to the right outer edge of the bag holder, the other end is connected to the weight by bypassing the fixed pulley fixedly mounted on the upper plate of the main frame body.

A further technical solution of the present disclosure is that the supporting plate is provided with an inclined deflector slide, the upper end of the deflector slide is opposite to the collection bag discharge port of the tower housing, and the lower end thereof is opposite to the falling port of the collection bag of the supporting plate, thereby that the collection bag discharge port of the tower housing communicates with the falling port of the collection bag of the support plate.

A further technical solution of the present disclosure is that the tower housing is provided with a parcel falling hole A facing the parcel falling port; the supporting plate is provided with a parcel falling hole B facing the parcel falling hole A;

Each sorting tower on any one of the supporting plates is aligned with each sorting tower on the adjacent with the relative position of upper supporting plate;

A parcel falling channel is provided between any two sorting towers located adjacent upper and lower and opposite to each other; the parcel falling channel is composed of a parcel falling port of the upper sorting tower, a corresponding parcel falling hole A of the upper sorting tower, a corresponding parcel falling hole B on the upper supporting plate and a corresponding parcel falling port on the lower sorting tower, which are sequentially connected from top to bottom.

The upper sorting tower is the one located above in two that are located adjacent with the relative position of upper and lower and opposite to each other, and the lower sorting tower is the one located below in two that are located adjacent with the relative position of upper and lower and opposite to each other, and the upper supporting plate is the one supporting the upper sorting tower.

A further technical solution of the present disclosure is that the controller is further included: the controller is respectively electrically connected with the hydraulic cylinder A of the first driving mechanism, the stepping motor A of the second driving mechanism, the hydraulic cylinder B of the third driving mechanism, the stepping motor B of the fourth driving mechanism, the correlation-type photoelectric sensor, the pressure sensor, the electromagnet A, the electromagnet B and the reversing motor.

Compared with the prior art, the invention has the following advantages:

1. Multi-path synchronous sorting efficiency is high: a plurality of sorting towers are mounted on each supporting plate of the main frame, and each sorting tower is connected to the corresponding lower sorting tower through the parcel falling channel. Therefore, a plurality of independently operating, non-interference sorting subsystems can be divided according to needs, and each sorting subsystem includes all the bagging output devices classified in the terminal regions. The plurality of sorting subsystems can perform sorting at the same time, which is equivalent to multi-path sorting, and the present disclosure improves the sorting efficiency compared to the single-way sorting of the existing parcel sorting system.

2. The path optimization has high sorting efficiency: a plurality of supporting plates can be arranged from top to bottom along the spiral slide, and each of the supporting plates is equipped with a sorting tower provided with a certain bagging output device at the terminal region. The parcel sorting path can be long or short, and can be collected directly in the bagging output device of the upper sorting tower or collected into the bagging output device of the lower sorting tower. Compared with the existing pyramid sorting system, all the parcels have to go through the longest sorting path to enter the lowermost parcel collection box. The sorting path of the present disclosure is better and energy saving.

3. Sustainable sorting has high sorting efficiency: when the bag holder is in the picking position of the collection bag, the receiving baffle and the connecting cloth connected to the side of the bag holder and located below the receiving baffle form a space temporarily receiving the parcels, which is used for temporarily receiving the parcels; when the bag holder that picks the collection bag moves from the position of the picking collection bag to the position of receiving the parcel, the connecting cloth is collected into the roll cylinder to make the upper opening and the parcel inlet port open, then the parcel temporarily received in the receiving baffle falls into the collection bag, thereby ensuring that the parcel sorting is continued, and the entire sorting process is not suspended due to the bag holder is at the position of picking the collection bags.

4. The discharging does not need to wait with the output efficiency to be high: all the collection bags discharged from the sorting tower are converged to the spiral slide, and finally discharged from the lower end of the spiral slide. The process of discharging the collection bag does not use any electric power or mechanical assistance, and the energy consumption is zero. Moreover, each sorting tower does not need to coordinate the discharge relationship with other sorting towers, and the collection bag is discharged as long as the output requirements are met.

The invention is further described below in conjunction with the drawings and the embodiments.

Figure 1:
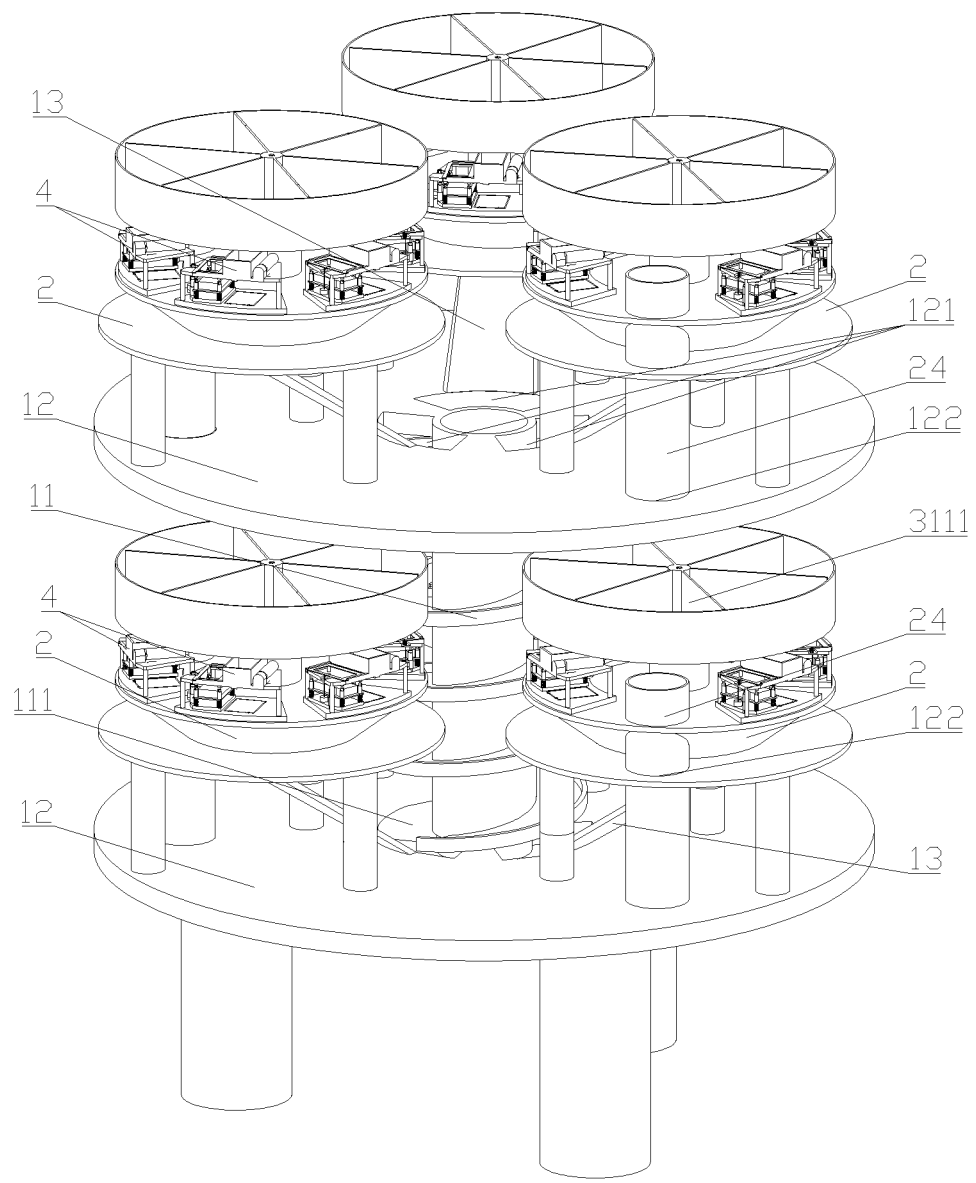
FIG. 1 is a schematic view of the structure of the present disclosure.
Figure 2:
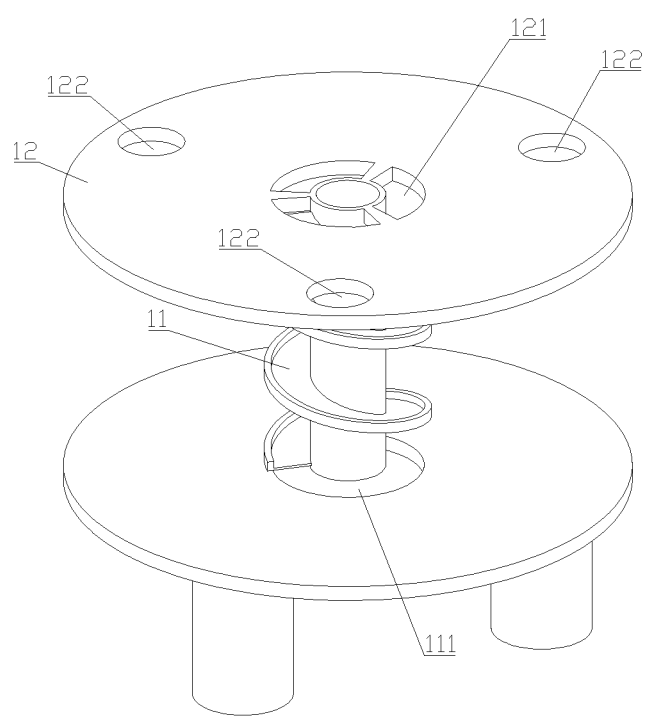
FIG. 2 is a schematic view of the structure of the main frame.
Figure 3:
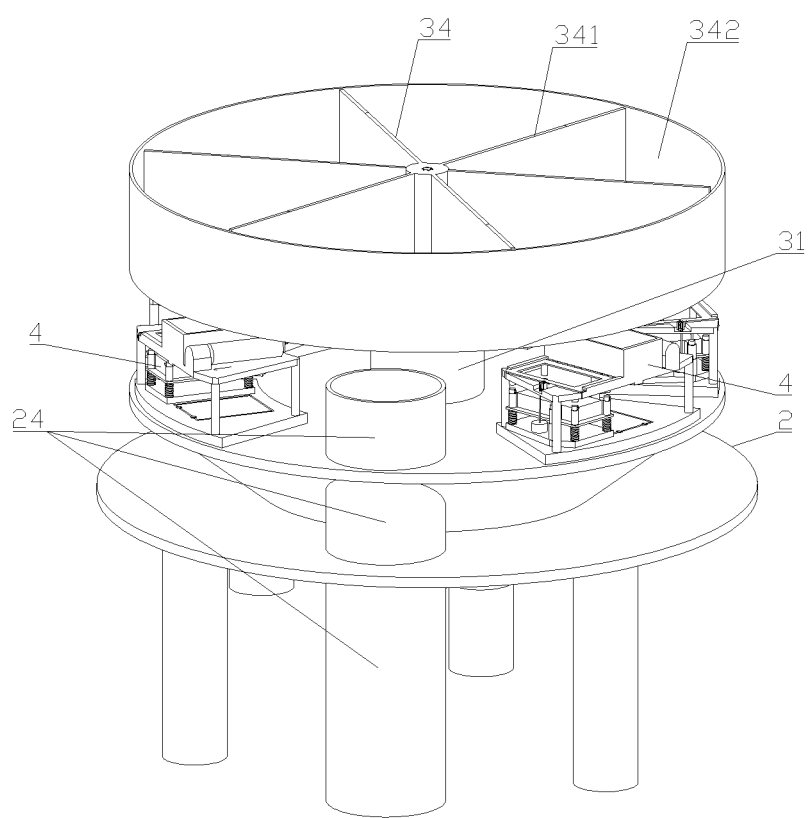
FIG. 3 is a schematic view showing the structure of the sorting tower.
Figure 4:
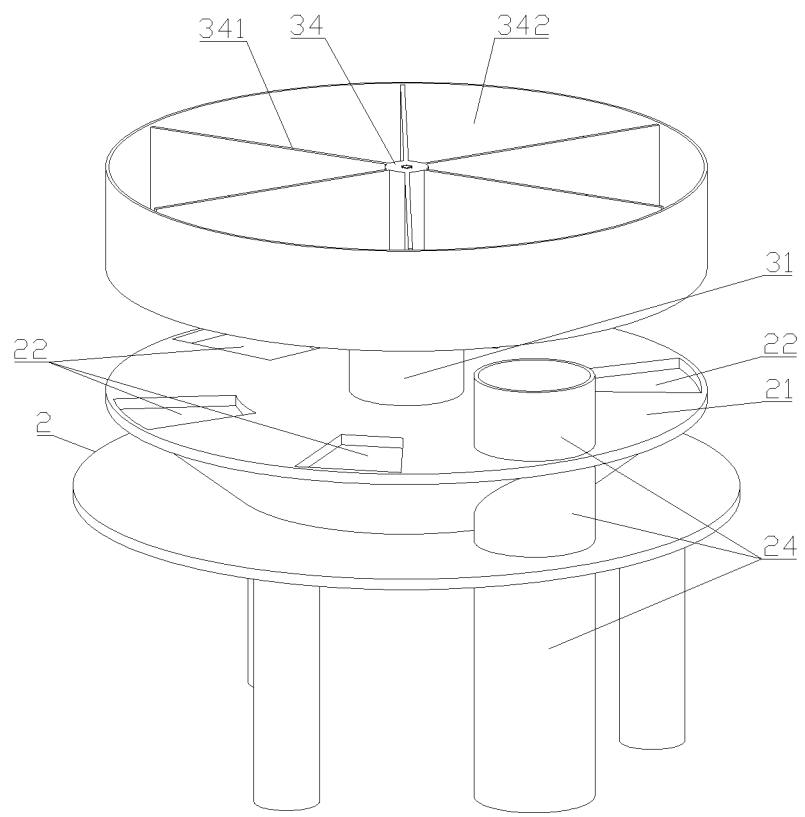
FIG. 4 is a schematic view showing the positional relationship between the tower housing of the sorting tower and the receiving transfer device of the sorting tower.
Figure 5:
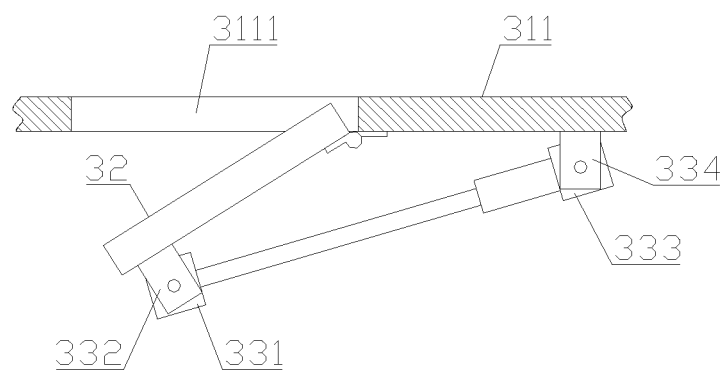
FIG. 5 is a schematic view showing the mounting position and structure of a first driving mechanism.
Figure 6:
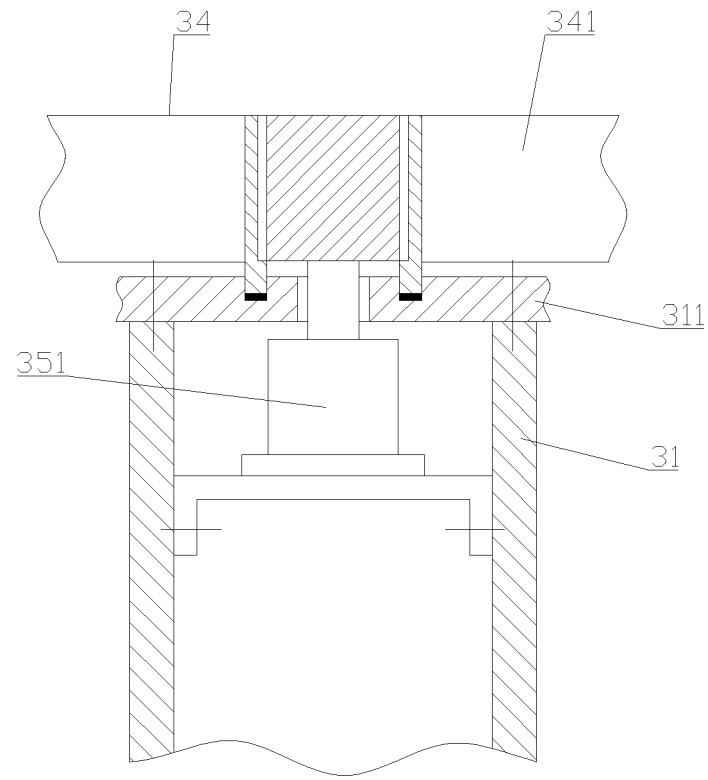
FIG. 6 is a schematic view showing a mounting position and a structure of a second driving mechanism.
Figure 7:
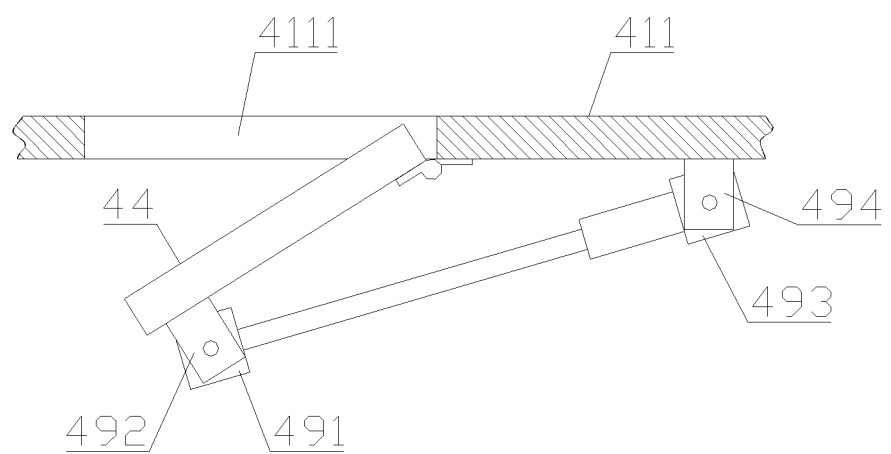
FIG. 7 is a schematic view showing a mounting position and a structure of a third driving mechanism.
Figure 8:
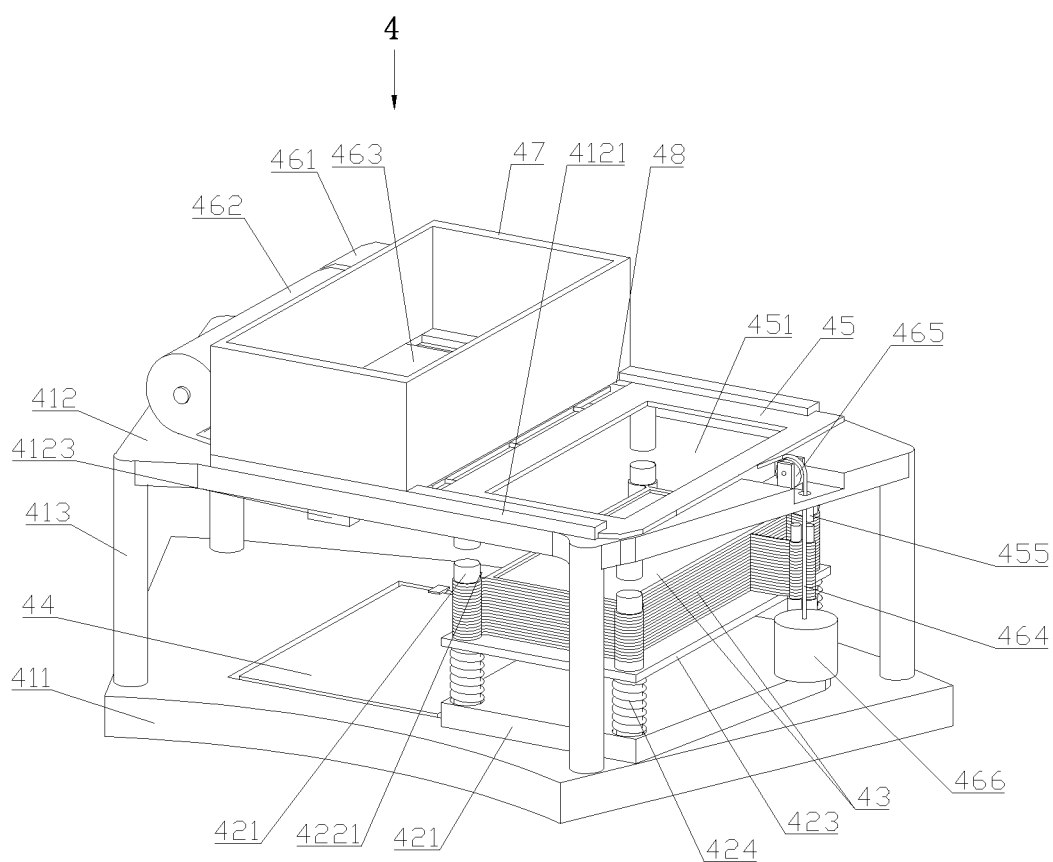
FIG. 8 is a schematic view showing the state of the bag holder of the bagging output device when locating the position of picking the collection bag.
Figure 9:
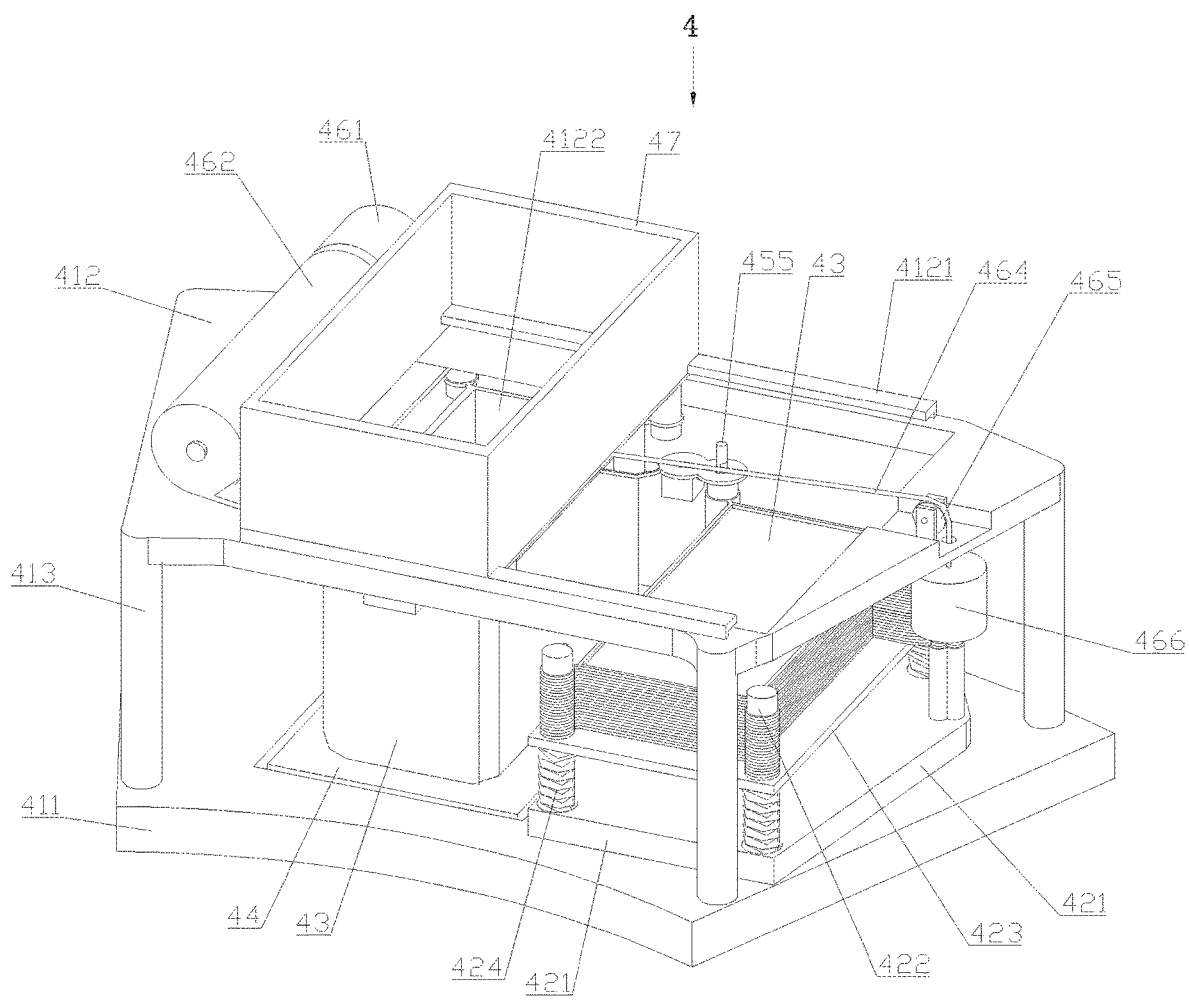
FIG. 9 is a schematic view showing the state of the bag holder of the bagging output device when locating the position of receiving the parcel.
Figure 10:
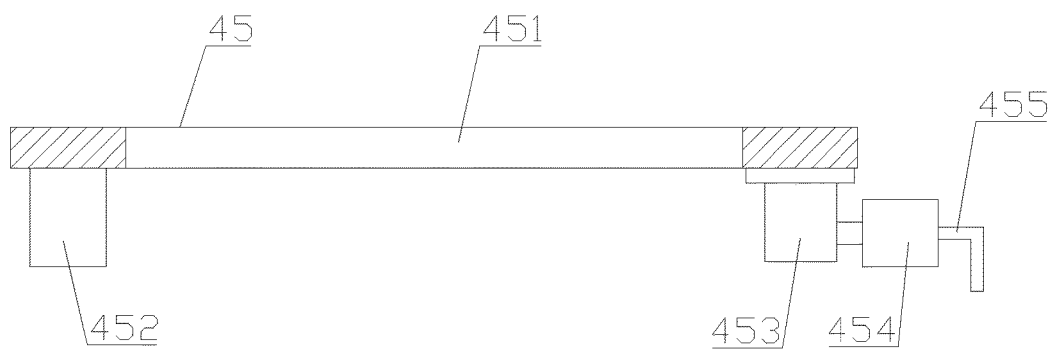
FIG. 10 is a schematic view showing the structure of a bag holder of the bagging output device.
Figure 11:
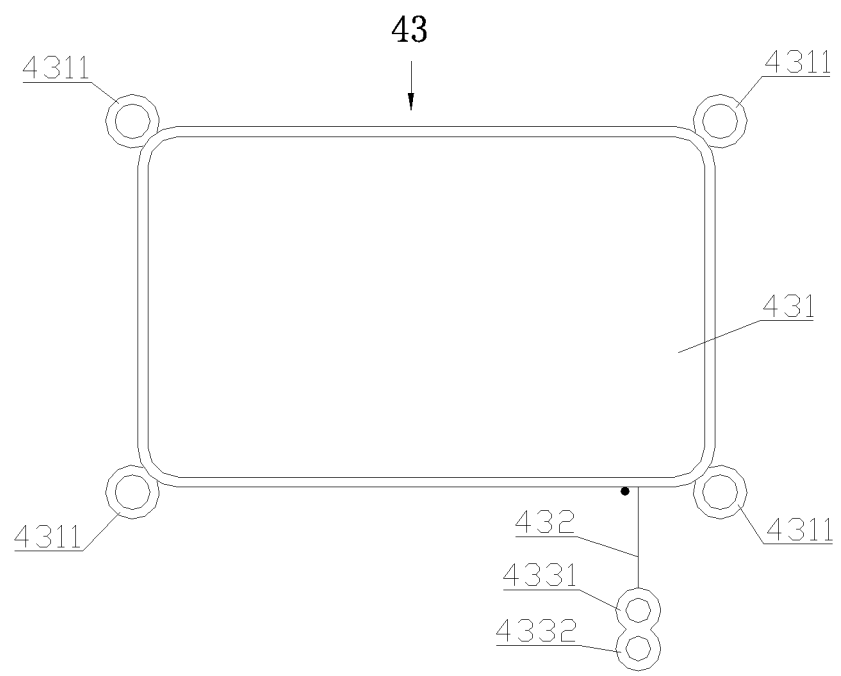
FIG. 11 is a schematic view showing the structure of a collection bag of a bagging output device.
Figure 12:
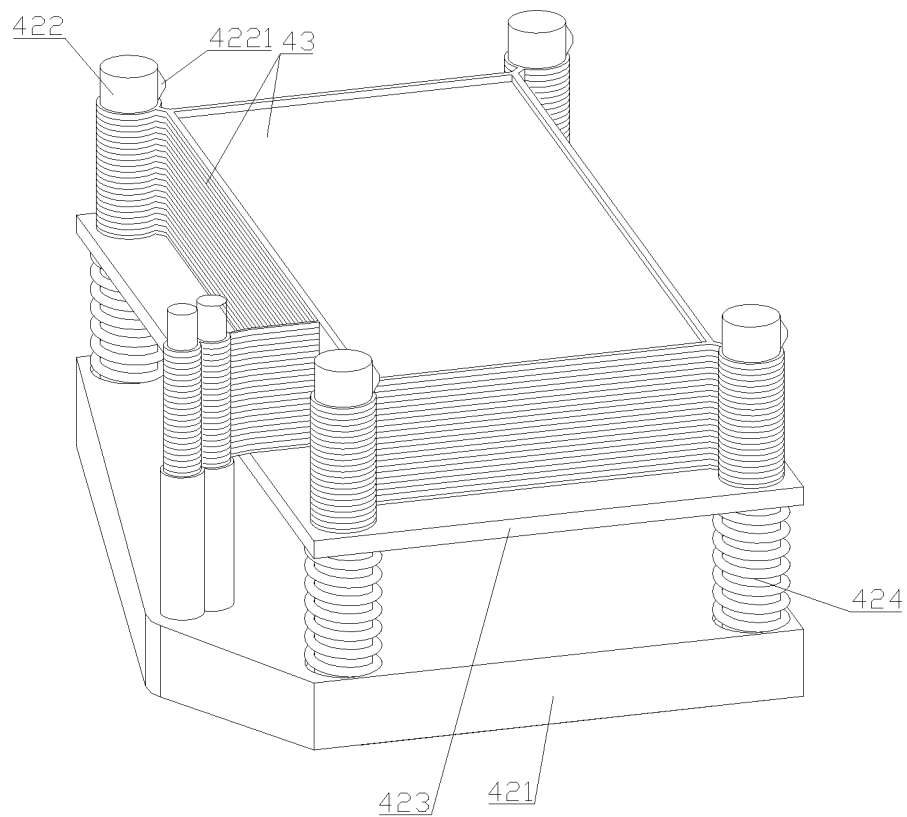
FIG. 12 is a schematic view showing the structure of a bag shelf of a bagging output device.
Figure 13:
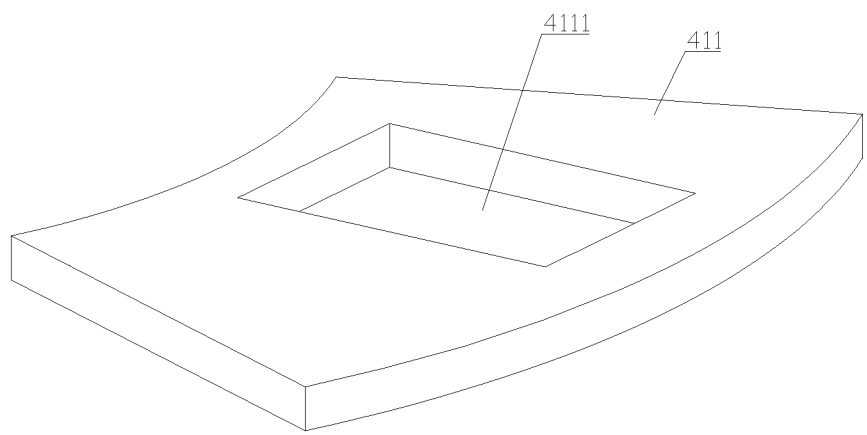
FIG. 13 is a schematic view showing the structure of a lower plate of the bagging output device.

Note:

spiral slide 11; collection bag main outlet 111; supporting plate 12; collection bag falling port 121; parcel falling hole B 122; deflector slide 13; tower housing 2; mounting plate A 21; collection bag inlet port 22; parcel falling hole A 24; bracket 31; mounting plate B 311; parcel falling port 3111; movable plate 32; hydraulic cylinder A 331; cylinder block A 332; connecting block A 333; connecting block seat A 334; sweeping disk 34, sweeping arm 341; transfer area 342;

stepping motor A 351; bagging output device 4; lower plate 411; lower opening 4111; upper plate 412; guide rail 4121; upper opening 4122; correlation-type photoelectric sensor 4123; connecting column 413; vertical column 422; spring button 4221; middle plate 423; push-up spring 424; collection bag 43; bag body 431; connecting piece 4311; drawstring 432; ring suction piece 4331; ring hook piece 4332; bag release plate 44, bad holder 45; parcel inlet port 451; electromagnet A 452; stepping motor 453; electromagnet B 454; hook 455; stepping motor B 461; rolling cylinder 462; connecting cloth 463; sling 464; fixed pulley 465; weight 466; receiving baffle 47; strip gap 48; hydraulic cylinder B 491; cylinder block B 492; connecting block B 493; connecting block seat B 494.

DETAILED DESCRIPTION OF EMBODIMENTS

Embodiment 1

As shown in FIG. 1-13, the multi-path synchronous sorting courier sorting system includes a main frame, a sorting tower and a controller (not shown).

The main frame includes a vertically arranged spiral slide 11 and a supporting plate 12 horizontally disposed outside the spiral slide 11, the number of the supporting plates 12 being at least one, and all the supporting plates 12 are spaced apart from top to bottom. The lower end of the spiral slide 11 is provided with a collection bag main outlet 111. The supporting plate 12 is provided with a collection bag falling port 121 that communicates with the spiral slide 11.

The sorting tower includes a receiving transfer device, a plurality of bagging output devices 4 disposed below the receiving transfer device, and a tower housing 2 disposed below the bagging output device.

The inside of the tower housing 2 is provided with a large upper and small lower bowl-shaped inner cavity (the cavity wall of the bowl-shaped inner cavity is a slope surface or a curved surface to play the role of guiding the collection bag filled with the parcels to slide downward), and the lower end thereof is provided with the collection bag discharge port connected to the bowl-shaped inner cavity, and the upper end is provided with a mounting plate A 21 provided with a collection bag inlet port 22 connected to the bowl-shaped inner cavity. The lower end of the tower housing 2 is supported and mounted on the supporting plate 12.

The receiving transfer device includes a bracket 31, a movable plate 32, a first driving mechanism, a sweeping disk 34, and a second driving mechanism. The upper end of the bracket 31 is provided with a mounting plate B 311 provided with a plurality of annular uniformly distributed parcel falling ports 3111. The movable plate 32 is movably mounted at each of the parcel falling ports 3111 and associated with the first driving mechanism, which is rotated by the first driving mechanism to open or close any of the parcel falling ports 3111. The sweeping disk 34 is provided with a plurality of sweeping arms 341, and a transfer area 342 is formed between the adjacent sweeping arms 341. The sweeping disk 34 is disposed at the upper end of the mounting plate B 311 and associated with the second driving mechanism, which is rotated by the second driving mechanism to sweep the parcels in the transfer area 342 to any of the parcel falling ports 3111. The receiving transfer device is provided at the upper end of the tower housing 2 fixed to the tower housing 2 via the bracket 31.

The bagging output device 4 includes a main frame body, a bag shelf, collection bags 43, a bag release plate 44, a third driving mechanism, a bag holder 45 and a fourth driving mechanism.

The main frame body includes a lower plate 411, an upper plate 412 above the lower plate 411, and a connecting column 413 connected between the lower plate 411 and the upper plate 412. The upper plate 412 is provided with a guide rail 4121 for reciprocating the bag holder and an upper opening 4122 for the parcels to fall into the collection bag 43 The lower plate 411 is provided with a lower opening 4111 facing the upper opening 4122 of the upper plate 412. A correlation-type photoelectric sensor 4123 is provided at the upper opening 4122 of the main frame body's upper plate 412.

The bag shelf is disposed between the lower plate 411 and the upper plate 412 of the main frame body, and includes a bottom plate 421 mounted on the lower plate 411, a plurality of vertical columns 422 vertically arranged and fixed on the bottom plate 421. a middle plate 423 movably mounted on the vertical column 422 and a push-up spring 424 movably sleeved on the column 422 and located between the middle plate 423 and the bottom plate 421, and the upper end of the column 422 is provided with a spring button 4221, and the spring button 4221 protrudes on the surface of the column 422 when unpressed, and is retracted into the interior of the column 422 when pressed. The spring button 4221 is preferably an elastic button structure on the main grip of the umbrella, which has the characteristics of being ejected when not pressed, and retracted when pressed.

The collection bag 43 includes a bag body 431, a drawstring 432, and a cord end tab. A loop of drawstring mounting cavity and a plurality of annular connecting pieces 4311 are arranged at the upper edge of the bag body 431. The drawstring mounting cavity is provided with an inlet and an outlet. The drawstring 432 penetrates into the drawstring mounting cavity through the inlet, and then passes through the drawstring mounting cavity from the outlet. One end of the drawstring 432 at the inlet is fixed at the upper edge of the bag body 431, or is knotted outside the bag body 431. One end of the drawstring 432 at the outlet is located outside the bag body 431 and is fixed to the cord end tab. The cord end tab includes a ring suction piece 4331 and a ring hook piece 4332 fixed to one end of the ring suction piece 4331. The collection bags 43 are stacked on the bag shelf in the vertical direction. The connecting piece 4311 and the ring suction piece 4331 on the collection bag 43 are respectively set on the corresponding columns 422 through the respective center holes, and all the collection bags 43 are located between the middle plate 423 and the spring button 4221, the ring suction pieces 4331 of all the collection bags 43 are aligned in the vertical direction.

The bag release plate 44 is movably mounted at the lower opening 4111 of the lower plate 411 by a hinge and associated with the third driving mechanism, which is rotated by the driving of the third driving mechanism to open or close the lower opening 4111. A pressure sensor (not shown) is provided on the bag release plate 44.

The bag holder 45 has a rectangular frame, and a parcel inlet port 451 for the parcel to fall into the collection bag 43 is provided at the center thereof, and an electromagnet A 452 and a reversing motor 453 are fixed at the lower end thereof, an electromagnet B 454 is coupled to the shaft of the reversing motor 453, and the electromagnet B 454 is connected with a hook 455, and the electromagnet B 454 is driven by the reversing motor 453 to switch the hook 455 vertically upward or vertically downward. The bag holder 45 is movably mounted in the guide rail 4121 of the upper plate 412 and associated with the fourth driving mechanism, which is reciprocated within the guide rail 4121 by the drive of the fourth driving mechanism, thereby changing between the position of the collection bag and the position of receiving parcel. When the bag holder 45 moves to the position of the collection bag, the electromagnet A 452 faces the connecting piece 4311 of the collection bag 43 mounted on the bag shelf, the electromagnet B 454 faces the ring suction piece 4331 of the collection bag 43 mounted on the bag shelf, and the hook 455 faces the ring hook piece 4332 of the collection bag 43 mounted on the bag shelf; when the bag holder 45 moves to the position of receiving parcel, it is located at the upper opening 4122 of the upper plate 412 and faces the lower opening 4111 of the lower plate 411. When the bag holder 45 picks the collection bag 43, the connecting piece 4311 of the collection bag 43 is affixed to the electromagnet A 452, and the ring suction piece 4331 of the collection bag 43 is affixed to the electromagnet B 454, and the ring hook piece 4332 of the collection bag 43 is hung on the hook 455 of the bag holder 45, the hook 455 is in a vertically upward state.

A plurality of bagging output devices 4 are disposed between the tower housing 2 and the receiving transfer device, and each of the bagging output devices 4 respectively corresponds to a parcel falling port 3111 of the receiving transfer device and a collection bag inlet port 22 of the tower housing 2, the bagging output device 4 is fixed on the mounting plate A 21 of the tower housing 2 through the lower plate 411, and the upper opening 4122 is opposite to the parcel falling port 3111 of the receiving transfer device, and the lower opening 4111 is opposite to the collection bag inlet port 22 of the tower housing 2.

A plurality of sorting towers are arranged on the supporting plates 12 around the slide 11, and the collection bag discharge ports 23 of each sorting tower is respectively connected to the collection bag falling port 121 of the collection bag of the supporting plate 12.

The controller is respectively electrically connected with the hydraulic cylinder A 331 of the first driving mechanism, the stepping motor A 351 of the second driving mechanism, the hydraulic cylinder B of the third driving mechanism, the stepping motor B of the fourth driving mechanism, the correlation-type photoelectric sensor 4123, and the pressure sensor. The electromagnet A 452, the electromagnet B 454, and the reversing motor 453.

Preferably, the first driving mechanism includes a hydraulic cylinder A 331, a cylinder block A 332, a connecting block A 333, and a connecting block seat A 334. The hydraulic cylinder A 331 is movably mounted on the cylinder block A 332 through the rotating shaft. The cylinder block A 332 is fixedly mounted below the mounting plate B 311, and the connecting block A 333 is fixed on the end of the telescopic link of the hydraulic cylinder A 331, and is movably connected to the connecting block seat A 334 through the rotating shaft, and the connecting block seat A 334 is fixedly mounted below the movable plate 32, and the telescopic link of the hydraulic cylinder A 331 is telescopically rotated to drive the movable plate 32 to rotate around the hinge, thereby opening or closing the parcel falling 3111.

Preferably, the second driving mechanism includes a stepping motor A 351 fixedly mounted in the bracket 31, and the crankshaft thereof extends vertically upward and is fixedly coupled to the sweeping disk 34 to drive the sweeping disk 34 to rotate on a horizontal plane.

Preferably, the third driving mechanism includes a hydraulic cylinder B 491, a cylinder block B 492, a connecting block B 493, and a connecting block seat B 494. The hydraulic cylinder B 491 is movably mounted on the cylinder block B 492 through the rotating shaft. The cylinder block B 492 is fixedly mounted below the lower plate 411 of the main frame body, and the connecting block B 493 is fixed on the end of the telescopic link of the hydraulic cylinder B 491, and is movably connected to the connecting block seat B 494 through the rotating shaft, and the connecting block seat B 494 is fixedly mounted below the bag discharging bag 44. The telescopic link of the hydraulic cylinder B 491 is telescopically rotated to drive the bag release plate 44 to rotate around the hinge, thereby opening the lower opening 4111 and the collection bag inlet port 22, or close the lower opening 4111 and the collection bag inlet port 22.

Preferably, the fourth driving mechanism includes a stepping motor B 461, a rolling cylinder 462, a connecting cloth 463, a sling 464, a fixed pulley 465, and a weight 466. The stepping motor B 461 is fixedly mounted on the main frame body's upper plate 412, and the crankshaft is coupled to the rolling cylinder 462 to drive the rolling cylinder 462 to rotate. One end of the connecting cloth 463 is wound around the rolling cylinder 462, and the other end is connected to the left outer edge of the bag holder 45 ("left" is only the relative position concept, and is opposite to the "right" below, without specifically referring to the direction). One end of the sling 464 is connected to the right outer edge of the bag holder 45 ("right" is only the relative position concept, opposite to the "left" above, without specifically referring to the direction), and the other end is connected to the weight 466 by bypassing the fixed pulley 465 fixedly mounted on the upper plate 412 of the main frame body. The stepping motor B 461 starts to rotate the rolling cylinder 462, and then moves the bag holder 45 through the connecting cloth 463 to move in the guide rail 4121. The weight 466 serves to provide traction force applied for the bag holder 45 to move from the receiving parcel position to the picking bag position.

Preferably, the upper end of the upper plate 412 of the main frame body is fixed with a receiving baffle 47 around the upper opening 4122. A strip gap 48 is provided between the receiving baffle 47 and the upper plate 412, allowing the bag holder 45 and the connecting cloth 463 pass through.

Preferably, the tower housing 2 is provided with a parcel falling hole A 24 facing the parcel falling port 3111; the supporting plate 12 is provided with a parcel falling hole B 122 facing the parcel falling hole A 24; any one of the sorting tower on each layer of supporting plate 12 is aligned with each sorting tower position on the adjacent upper supporting plate 12. A parcel falling channel is provided between any two sorting towers located adjacent upper and lower and opposite to each other; the parcel falling channel is composed of a parcel falling port 3111 of the upper sorting tower, a corresponding parcel falling hole A 24 of the upper sorting tower, a corresponding parcel falling hole B 122 on the upper supporting plate and a corresponding parcel falling port 3111 on the lower sorting tower, which are sequentially connected from top to bottom. The upper sorting tower is the one located above in two that are located adjacent upper and lower and opposite to each other, and the lower sorting tower is the one located below in two that are located adjacent upper and lower and opposite to each other, and the upper supporting plate is the one supporting the upper sorting tower.

Preferably, the supporting plate 12 is provided with a deflector slide 13 which is opposite to the collection bag discharge port of the tower housing 2 and whose lower end faces the collection bag falling port 121 of the supporting plate 12, thereby that the collection bag discharge port of the tower housing 2 communicates with the collection bag falling port 121 of the supporting plate 12.

Figure 14:
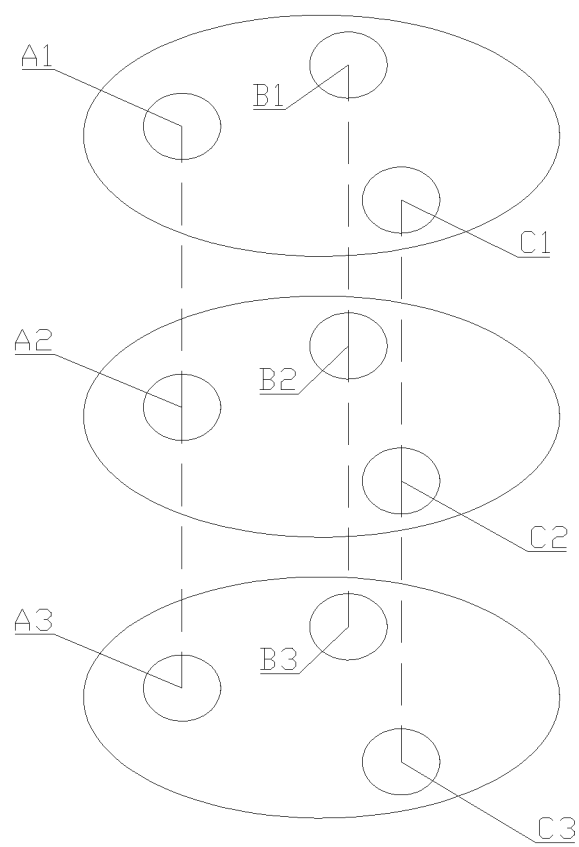
FIG. 14 is a schematic diagram of the division of the subsystem.

Briefly, the workflow of the present disclosure is described below:

Prior to parcel sorting, the sorting system is in an initial state, in which state:

a, the bag holder 45 picks a collection bag 43 and at a position of receiving parcel;

b, the movable plate 32 is at a position where the parcel falling port 3111 is closed;

c, the bag release plate 44 is at a position to where the lower opening 4111 and the collection bag inlet port 22;

S01, dividing into subsystem:

The user divides the sorting system into one or more subsystems for sorting according to the number of terminal regions and the number of parcels to be sorted, and the subsystem includes one or more sorting towers connected up and down; the divided subsystem groups should meet the sorting needs of all terminal regions (ie, at least one bagging output device should be included for corresponding collection of the parcel at the terminal region);

In this step, the sorting tower includes a plurality of bagging output devices, and each bagging output device is only used to collect the parcels in one terminal region;

The division of subsystems is illustrated in FIG. 14. It is assumed that there are five bagging output devices in a sorting tower (that is, parcels in five terminal regions can be collected), and the number of terminal regions is 13. Three sorting towers connected up and down are considered as one subsystem, which can meet the sorting needs of all terminal regions. As shown in FIG. 14, the sorting towers A1, A2, and A3 are included in one subsystem, the sorting towers B1, B2, and B3 are included in one subsystem, and the sorting towers C1, C2, and C3 are included in one subsystem, and there are three independent operational subsystems. A1, B1, and C1 are the uppermost sorting towers in the respective subsystems. There are a total of 15 bagging output devices in each subsystem, enough to allocate 13 terminal regions.

S02, the parcel entering the corresponding bagging output device through the sorting path:

a, the outer scanned parcels being transported to the transfer area 342 of the uppermost sorting tower in the subsystem;

b. The controller first controlling the stepping motor A351 to start according to the pre-calculated parcel sorting path, so that the sweeping wheel 34 rotates, and sweeps the parcels to the corresponding parcel falling port 3111; and then controlling the hydraulic cylinder A 331 to start, so that the movable plate 32 at the parcel falling port 3111 is rotated downward to open the parcel falling port 3111, and the parcel falls into the corresponding bagging output device 4 or enters the parcel falling channel;

c. the parcel entering the parcel falling channel falling into the transfer area of the adjacent lower sorting tower, and then b sub-step being repeated, so that the parcel finally falls into the corresponding bagging output device 4;

S03, parcel bagging and outputting:

a. the parcels in the same terminal region falling into the collection bag 43 of the bagging output device 4, and being pressed through the collection bag 43 onto the bag release plate 44;

b. When the correlation-type photoelectric sensor 4123 detects that the parcel in the collection bag 43 exceeds the preset height, or the pressure sensor detects that the parcel in the collection bag 43 exceeds the preset weight, the controller then controlling the hydraulic cylinder B 491 to start, so that the bag release plate 44 is rotated downward to open the lower opening 4111 of the bagging output device 4 and the collection bag inlet port 22 of the tower housing 2;

c. the controller then controlling the electromagnet A 452 and the electromagnet B 454 to be powered off, so that the connecting piece 4311 and the ring suction piece 4331 of the collection bag 43 are disconnected from the electromagnet A 452 and the electromagnet B 454 respectively, so that the collection bag 43 is only hung on the hook 455 of the bag holder 45 through the ring hook piece 4332, and the parcel in the collection bag 43 pulls the drawstring 432 from the outlet end of the drawstring mounting cavity by its own weight, and closes the collection bag 43;

d, then the controller controlling the reversing motor 453 to be activated, and the hook 455 being turned to the vertically downward state, and the collected bag 43 that has been closed then falls and is discharged from the lower opening 4111 of the bagging output device 4.

S04, the collection bag being discharged through a spiral slide:

The collection bag 43 discharged from the lower opening 4111 of the bagging output device 4 passing through the collection bag inlet port 22 of the tower housing 2 into the bowl-shaped inner cavity of the tower housing 2, and sliding down the wall of the bowl-shaped inner cavity, then being discharged from the collection bag discharge port of the tower housing 2, and entering the collection bag falling port 121 of the supporting plate 12 through the deflector slide 13, which falls on the spiral slide 11, slides down the spiral slide 11, and is finally discharged from the collection bag main outlet 111 below the spiral slide 11.

Briefly, the workflow of the bagging output device is described below:

Before the parcel is automatically bagged, the bagging output device is in an initial state, in which state:

a, the hook 455 is in a vertically downward state;

b, the bag holder 45 picks a collection bag 43 and in the position of receiving parcel;

c, the bag release plate 44 is rotated to the horizontal position, thereby closing the lower opening 4111 of the bagging output device 4 and the collection bag inlet port 22 of the tower housing 2.

S01, the collection bag receiving the parcel:

The sorted parcel falls into the collection bag 43 through the upper opening 4122 of the upper plate 412, and the parcel falls into the collection bag 43, and is pressed against the bag release plate 44 through the collection bag 43.

S02, collection bag being knotted and output:

a, when the correlation-type photoelectric sensor 4123 detects that the parcel in the collection bag 43 exceeds the preset height, or the pressure sensor detects that the parcel in the collection bag 43 exceeds the preset weight, the controller then controlling the hydraulic cylinder B 491 to start, so that the bag release plate is rotated downward to open the lower opening 4111 of the bagging output device 4 and the collection bag inlet port 22 of the tower housing 2;

b, the controller then controlling the electromagnet A 452 and the electromagnet B 454 to be powered off, so that the connecting piece 4311 and the ring suction piece 4331 of the collection bag 43 are disconnected from the electromagnet A 452 and the electromagnet B 454 respectively, so that the collection bag 43 is only hung on the hook 455 of the bag holder 45 through the ring hook piece 4332, and the parcel in the collection bag 43 pulls the drawstring 432 from the outlet end of the drawstring mounting cavity by its own weight, and closes the collection bag 43;

c, then the controller controlling the reversing motor 453 to start, turning the hook 455 to the vertically downward state, and the collection bag 43 that has been closed is then falling and is discharged from the lower opening 4111 of the bagging output device 4.

S03, picking a new collection bag:

When the knotted collection bag 43 is discharged, the controller simultaneously performs the following two controls:

a, controlling the stepping motor B 461 to start, so that the bag holder 45 is moved to the position of the collection bag;

b, controlling the hydraulic cylinder B 491 to be activated, the bag release plate 44 is rotated upward to a horizontal position, thereby closing the lower opening 4111 of the bagging output device 4 and the collection bag inlet port 22 of the tower housing 2;

After the bag holder 45 is moved to the position of the collection bag, the electromagnet B 454 and the electromagnet A 452 below the bag holder 45 are activated, and a collection bag 43 of the uppermost layer of the bag shelf is adsorbed to the lower end of the bag holder 45;

When the collection bag 43 is adsorbed below the bag holder 45, the controller simultaneously performs the following two controls:

a, controlling the reversing motor 453 to start, turning the hook 455 to the vertical upward state;

b. controlling the stepping motor B 461 to start, and moving the bag holder 45 to the position of receiving parcel.

In step S03, the collection bag 43 stacked on the bag holder are brought into close contact with each other by the elastic force of the push-up spring 424, and the uppermost collection bag 43 is always pressed against the lower end of the spring button 4221 on the vertical column 422, thereby ensuring the distance between the bag holder 45 at the picking position of the collection bag and the uppermost collection bag 43 is always kept constant, and the distance is not gradually changed by the consumption of the collection bag 43, thereby eliminating the influence of the distance change on the adsorption force.

In step S03, when the bag holder 45 picks the collection bag, the uppermost collection bag 43 receives the adsorption force larger than that the lower collection bag 43 receives, and the adsorption force provided by the electromagnet A 452 and the electromagnet B 454 of the bag holder 45 can only make the uppermost collection bag 43 attracted to below the bag holder 45 through the spring button 4221 on the column 422, and is not sufficient for the lower collection bag 43 to pass through the spring button 4221 on the column 422.

In step S03, when the bag holder 45 is picking the collection bag 43, the receiving baffle 47 and the connecting cloth 463 connected to the side of the bag holder 45 and located below receiving baffle 47 form a space for temporarily receiving parcels. The space serves to temporarily receive the parcel; after the bag holder 45 that has picked the collection bag 43 is moved from the position of the collection bag to the position of receiving parcel, the connecting cloth 463 is taken into the roll cylinder 462 to make the upper opening 4122 and the parcel inlet port 451 open, and the parcel temporarily received in the receiving baffle 47 falls into the collection bag 43, thereby ensuring that the parcel sorting continues.

What is claimed is:

1. A parcel sorting system capable of multi-path simultaneous sorting, wherein it comprises a main frame and a plurality of sorting towers;

the main frame comprises a spiral slide vertically arranged and supporting plates horizontally arranged outside the spiral slide, at least one of the supporting plates is provided, and all the supporting plates are spaced apart from top to bottom; a lower end of the spiral slide is provided with a collection bag main outlet; each of the supporting plates is provided with a collection bag falling port facing the spiral slide;

each of the plurality of sorting towers comprises a receiving transfer device, a plurality of bagging output devices disposed below the receiving transfer device, a tower housing disposed below the bagging output device, and a bowl-shaped inner cavity with a large upper and a small lower space inside the tower housing a lower end of the tower housing is provided with a collection bag discharge port connected to the bowl-shaped inner cavity, and an upper end of the tower housing is provided with a mounting plate A provided with a collection bag inlet port connected to the bowl-shaped inner cavity; the lower end of the tower housing is supported and mounted on the each of the supporting plates;

the plurality of sorting towers are arranged on the supporting plates around the spiral slide, and the collection bag discharge port of each sorting tower is respectively connected to the collection bag falling port of the each of the supporting plates.

2. The parcel sorting system capable of multi-path simultaneous sorting according to claim 1, wherein the receiving transfer device comprises a bracket, a movable plate, a first driving mechanism, a sweeping disk and a second driving mechanism; an upper end of the bracket is provided with a mounting plate B provided with a plurality of annular uniformly distributed parcel falling ports; the movable plate is movably mounted at each of the parcel falling ports by a hinge, and is associated with the first driving mechanism, the movable plate is driven by the first driving mechanism to rotate, thereby opening or closing any of the parcel falling ports; a plurality of sweeping arms are disposed at the sweeping disk, and a transfer area is formed between the sweeping arms adjacent to each other; the sweeping disk is disposed at an upper end of the mounting plate B and associated with the second driving mechanism, and is driven by the second driving mechanism to rotate, thereby sweeping the parcels in the transfer area to any of the parcel falling ports;

the receiving transfer device is disposed at the upper end of the tower housing and is fixed to the tower housing by the bracket.

3. The parcel sorting system capable of multi-path simultaneous sorting according to claim 2, wherein each bagging output device comprises a main frame body, a bag shelf, collection bags, a bag release plate, a third driving mechanism, a bag holder and a fourth driving mechanism;

the main frame body comprises a lower plate, an upper plate above the lower plate and a connecting column connected between the lower plate and the upper plate; the upper plate is provided with a guide rail for reciprocating the bag holder, and an upper opening for the parcels dropped onto each of the collection bags; a lower layer is provided with a lower opening facing the upper opening of the upper plate, the upper opening of the upper plate of the main frame body is provided with a bijection photoelectric sensor;

the bag shelf is disposed between the lower plate and the upper plate of the main frame body, and comprises a bottom plate mounted on the lower plate, a plurality of vertical columns vertically arranged and fixed on the bottom plate, a middle plate movably sleeved on the vertical columns and a push-up spring movably sleeved on the column and located between the middle plate and the bottom plate, and an upper end of the vertical column is provided with a spring button, and the spring button protrudes on a surface of the vertical column when unpressed, and is retracted into an interior of the vertical column when pressed;

each of the collection bags comprises a bag body, a drawstring and a cord end tab; a loop of drawstring mounting cavity and a plurality of annular connecting pieces are arranged at an upper edge of the bag body, the drawstring mounting cavity is provided with an inlet and an outlet; the drawstring is worn through the inlet into the drawstring mounting cavity, and then out of the outlet through the drawstring mounting cavity, an end of the drawstring at the inlet is fixed at the upper edge of the bag body, or knotted outside the bag body, an end of the drawstring at the outlet locates outside the bag body, and is fixed at the cord end tab; the cord end tab comprises a ring suction piece and a ring hook piece fixed at one end of the ring suction piece; the collection bags are stacked on the bag shelf in a vertical direction, and the connecting piece and the ring suction piece are respectively sleeved on a corresponding vertical columns through respective center holes, and all the collection bags locate between the middle plate and the spring button, and the ring suction pieces of all the collection bags are aligned in the vertical direction;

the bag release plate is movably mounted on the lower opening of the lower plate by a hinge, and is associated with the third driving mechanism, it is driven to rotate under a driving of the third driving mechanism, thereby opening or closing the lower opening, and a pressure sensor is provided thereon;

the bag holder is a rectangular frame, and a parcel inlet port for the parcels to fall into the collection bag is arranged at the center, a lower end thereof is fixed with an electromagnet A and a reversing motor, an electromagnet B is coupled to a shaft of the reversing motor, and the electromagnet B is connected with a hook; the electromagnet B is driven to rotate by the reversing motor to switch the hook vertically upward or vertically downward; the bag holder is movably mounted in the guide rail of the upper plate, and is associated with the fourth driving mechanism, a reciprocal movement of the bag holder in the guide rail is driven by the fourth driving mechanism, thereby changing between a position of the collection bag and the position of receiving parcel; when the bag holder moves to the position of the collection bag, the electromagnet A faces the connecting piece of the collection bag mounted on the bag shelf, the electromagnet B faces the ring suction piece of the collection bag mounted on the bag shelf, and the hook faces the ring hook piece of the collection bag mounted on the bag shelf; when the bag holder moves to the position of receiving parcel, it is located at the upper opening of the upper plate and faces the lower opening of the lower plate;

the plurality of bagging output devices are provided between the tower housing and the receiving transfer device, and each of the bagging output devices respectively corresponds to a parcel falling port of the receiving transfer device and a collection bag inlet port of the tower housing, the bagging output device is fixed to the mounting plate A of the tower housing through the lower plate, and the upper opening thereof is opposite to the parcel falling port of the receiving transfer device, and the lower opening thereof is opposite to the inlet port of the collection bag of the tower housing.

4. The parcel sorting system capable of multi-path simultaneous sorting according to claim 3, wherein an upper layer of the main frame body is provided with a receiving baffle surrounding the upper opening, and the receiving baffle and the upper plate are provided with a strip gap between the receiving baffle and the upper plate.

5. The parcel sorting system capable of multi-path simultaneous sorting according to claim 4, wherein the first driving mechanism comprises a hydraulic cylinder A, a cylinder block A, a connecting block A and a connecting block seat A; the hydraulic cylinder A is movably mounted on the cylinder block A through a rotating shaft, and the cylinder block A is fixedly mounted below the mounting plate B; the connecting block A is fixed on an end of a telescopic link of the hydraulic cylinder A, and is movably connected to the connecting block seat A through the rotating shaft, and the connecting block seat A is fixedly mounted below the movable plate;

the second driving mechanism comprises a stepping motor A fixedly mounted in the bracket, and a crankshaft thereof extends vertically upward and is fixedly connected with the sweeping disk;

the third driving mechanism comprises a hydraulic cylinder B, a cylinder block B, a connecting block B and a connecting block seat B; the hydraulic cylinder B is movably mounted on the cylinder block B through a rotating shaft, and the cylinder block B is fixedly mounted below the lower plate of the main frame body; the connecting block B is fixedly connected to an end of the telescopic link of the hydraulic cylinder B, and is movably connected to the connecting block seat B through the rotating shaft, and the connecting block seat B is fixedly mounted below the bag release plate;

the fourth driving mechanism comprises a stepping motor B, a rolling cylinder, a connecting cloth, a sling, a fixed pulley and a weight; the stepping motor B is fixedly mounted on the upper plate of the main frame body, and a crankshaft thereof is coupled to the rolling cylinder to drive the rolling cylinder to rotate; one end of the connection cloth is wound around the rolling cylinder, and the other end is connected to a left outer edge of the bag holder; one end of the sling is attached to a right outer edge of the bag holder, the other end is connected to the weight by bypassing the fixed pulley fixedly mounted on the upper plate of the main frame body.

6. The parcel sorting system capable of multi-path simultaneous sorting according to claim 5, wherein the each of the supporting plates is provided with an inclined deflector slide, an upper end of the deflector slide is opposite to the collection bag discharge port of the tower housing, and the a lower end thereof is opposite to the collection bag falling port of each of the supporting plates, thereby that the collection bag discharge port of the tower housing communicates with the collection bag falling port of the each of the supporting plates.

7. The parcel sorting system capable of multi-path simultaneous sorting according to claim 6, wherein: the tower housing is provided with a parcel falling hole A facing the parcel falling port; and the each of the supporting plates is provided with a parcel falling hole B facing the parcel falling hole A;

each sorting tower on any layer of the supporting plates is aligned with each sorting tower on the adjacent upper supporting plate;

a parcel falling channel is provided between any two sorting towers located adjacent with a relative position of upper and lower and opposite to each other; the parcel falling channel is composed of a parcel falling port of the upper sorting tower, a corresponding parcel falling hole A of the upper sorting tower, a corresponding parcel falling hole B on the upper supporting plate and a corresponding parcel falling port on the lower sorting tower, which are sequentially connected from top to bottom.

the upper sorting tower is the one located above in two that are located adjacent with the relative position of upper and lower and opposite to each other, and the lower sorting tower is the one located below in two that are located adjacent with the relative position of upper and lower and opposite to each other, and the upper supporting plate is the one supporting the upper sorting tower.

8. The parcel sorting system capable of multi-path simultaneous sorting according to claim 7, further comprising a controller; the controller is respectively electrically connected with the hydraulic cylinder A of the first driving mechanism, the stepping motor A of the second driving mechanism, the hydraulic cylinder B of the third driving mechanism, the stepping motor B of the fourth driving mechanism, the bijection photoelectric sensor, the pressure sensor, the electromagnet A, the electromagnet B and the reversing motor.

9. The parcel sorting system capable of multi-path simultaneous sorting according to claim 3, wherein the first driving mechanism comprises a hydraulic cylinder A, a cylinder block A, a connecting block A and a connecting block seat A; the hydraulic cylinder A is movably mounted on the cylinder block A through a rotating shaft, and the cylinder block A is fixedly mounted below the mounting plate B; the connecting block A is fixed on an end of a telescopic link of the hydraulic cylinder A, and is movably connected to the connecting block seat A through the rotating shaft, and the connecting block seat A is fixedly mounted below the movable plate;

the second driving mechanism comprises a stepping motor A fixedly mounted in the bracket, and a crankshaft thereof extends vertically upward and is fixedly connected with the sweeping disk;

the third driving mechanism comprises a hydraulic cylinder B, a cylinder block B, a connecting block B and a connecting block seat B; the hydraulic cylinder B is movably mounted on the cylinder block B through a rotating shaft, and the cylinder block B is fixedly mounted below the lower plate of the main frame body; the connecting block B is fixedly connected to an end of the telescopic link of the hydraulic cylinder B, and is movably connected to the connecting block seat B through the rotating shaft, and the connecting block seat B is fixedly mounted below the bag release plate;

the fourth driving mechanism comprises a stepping motor B, a rolling cylinder, a connecting cloth, a sling, a fixed pulley and a weight; the stepping motor B is fixedly mounted on the upper plate of the main frame body, and a crankshaft thereof is coupled to the rolling cylinder to drive the rolling cylinder to rotate; one end of the connection cloth is wound around the rolling cylinder, and the other end is connected to a left outer edge of the bag holder; one end of the sling is attached to a right outer edge of the bag holder, the other end is connected to the weight by bypassing the fixed pulley fixedly mounted on the upper plate of the main frame body.

10. The parcel sorting system capable of multi-path simultaneous sorting according to claim 9, wherein the each of the supporting plates is provided with an inclined deflector slide, an upper end of the deflector slide is opposite to the collection bag discharge port of the tower housing, and the lower end thereof is opposite to the collection bag falling port of the each of the supporting plates, thereby that the collection bag discharge port of the tower housing communicates with the the collection bag falling port of the support plate.

11. The parcel sorting system capable of multi-path simultaneous sorting according to claim 10, wherein: the tower housing is provided with a parcel falling hole A facing the parcel falling port; and the each of the supporting plates is provided with a parcel falling hole B facing the parcel falling hole A;

each sorting tower on any layer of the supporting plates is aligned with each sorting tower on the adjacent upper supporting plate;

a parcel falling channel is provided between any two sorting towers located adjacent with a relative position of upper and lower and opposite to each other; the parcel falling channel is composed of a parcel falling port of the upper sorting tower, a corresponding parcel falling hole A of the upper sorting tower, a corresponding parcel falling hole B on the upper supporting plate and a corresponding parcel falling port on the lower sorting tower, which are sequentially connected from top to bottom, the upper sorting tower is the one located above in two that are located adjacent with the relative position of upper and lower and opposite to each other, and the lower sorting tower is the one located below in two that are located adjacent with the relative position of upper and lower and opposite to each other, and the upper supporting plate is the one supporting the upper sorting tower.

12. The parcel sorting system capable of multi-path simultaneous sorting according to claim 11, further comprising a controller; the controller is respectively electrically connected with the hydraulic cylinder A of the first driving mechanism, the stepping motor A of the second driving mechanism, the hydraulic cylinder B of the third driving mechanism, the stepping motor B of the fourth driving mechanism, the bijection photoelectric sensor, the pressure sensor, the electromagnet A, the electromagnet B and the reversing motor.

* * * * *